(12) United States Patent  
Chelaidite et al.

(10) Patent No.: US 10,288,137 B2  
(45) Date of Patent: *May 14, 2019

(54) BRAKE PISTON

(71) Applicant: AKEBONO BRAKE INDUSTRY CO., LTD, Chuo-ku, Tokyo (JP)

(72) Inventors: Galus Chelaidite, South Lyon, MI (US); Michio Suzuki, Commerce, MI (US)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/946,875

(22) Filed: Apr. 6, 2018

(65) Prior Publication Data

US 2018/0223932 A1 Aug. 9, 2018

Related U.S. Application Data

(63) Continuation of application No. 15/275,791, filed on Sep. 26, 2016, now Pat. No. 9,964,165.

(Continued)

(51) Int. Cl.
| | |
|---|---|
| *B60T 11/10* | (2006.01) |
| *F16D 65/18* | (2006.01) |
| *B60T 11/04* | (2006.01) |
| *F16D 65/14* | (2006.01) |
| *F16D 55/226* | (2006.01) |

(Continued)

(52) U.S. Cl.
CPC .............. *F16D 65/18* (2013.01); *B60T 11/04* (2013.01); *F16D 55/226* (2013.01); *F16D 65/14* (2013.01); *F16D 2121/04* (2013.01); *F16D 2121/24* (2013.01); *F16D 2123/00* (2013.01); *F16D 2125/06* (2013.01); *F16D 2125/40* (2013.01)

(58) Field of Classification Search
CPC .... F16D 65/0075; F16D 65/18; F16D 55/226; B60T 8/17
USPC ................................ 188/72.1–72.4, 156–164
See application file for complete search history.

(56) References Cited

U.S. PATENT DOCUMENTS 4,858,516 A * 8/1989 Klein ...................... F16D 65/18  
92/240  
5,826,681 A * 10/1998 Kubo ...................... F16D 65/18  
188/71.8

(Continued)

FOREIGN PATENT DOCUMENTS

| EP | 2165899 A1 | 3/2010 |
|---|---|---|
| EP | 2965961 A2 | 1/2016 |

(Continued)

*Primary Examiner* — Christopher P Schwartz  
(74) *Attorney, Agent, or Firm* — The Dobrusin Law Firm, P.C.

(57) ABSTRACT

A brake piston includes a piston pocket. The piston pocket receives a nut that is axially moveable along a center axis. The nut is restricted from rotating within the piston pocket when a torque due to a frictional engagement between a nut seal and an inner pocket wall, one or more projections, or both is greater than an it torque at the nut. The nut is rotatable within the piston pocket when a torque due to the frictional engagement between the nut seal and the inner pocket wall, the one or more projections or both is less than the input torque at the nut and is less than the torque due to the frictional engagement between the piston and the piston seal.

20 Claims, 3 Drawing Sheets

Related U.S. Application Data

(60) Provisional application No. 62/263,198, filed on Dec. 4, 2015.

(51) Int. Cl.

| | |
|---|---|
| *F16D 125/06* | (2012.01) |
| *F16D 125/40* | (2012.01) |
| *F16D 121/04* | (2012.01) |
| *F16D 121/24* | (2012.01) |
| *F16D 123/00* | (2012.01) |

(56) References Cited

U.S. PATENT DOCUMENTS

| | | |
|---|---|---|
| 9,273,738 B2 | 3/2016 | Rehfus et al. |
| 9,308,990 B2 | 4/2016 | Drennen et al. |
| 9,964,165 B2 * | 5/2018 | Chelaidite ............... B60T 11/04 |
| 2003/0024777 A1 * | 2/2003 | Kurimoto .............. F16J 15/164 |
| | | 188/72.3 |
| 2007/0034459 A1 | 2/2007 | Matsushita et al. |
| 2007/0062764 A1 | 3/2007 | Takahashi et al. |
| 2008/0135354 A1 | 6/2008 | Petri et al. |
| 2010/0078274 A1 | 4/2010 | Jackson et al. |
| 2010/0154407 A1 * | 6/2010 | Bernadat ............... B60T 11/236 |
| | | 60/533 |
| 2011/0308898 A1 | 12/2011 | Shiraki |
| 2012/0018262 A1 | 1/2012 | Winkler |
| 2012/0325597 A1 | 12/2012 | Giering et al. |
| 2014/0158480 A1 | 6/2014 | Qian et al. |
| 2015/0053512 A1 | 2/2015 | Lee et al. |
| 2015/0323027 A1 | 11/2015 | Bourlon |
| 2015/0330467 A1 | 11/2015 | Bourlon |
| 2016/0010668 A1 | 1/2016 | Kim et al. |

FOREIGN PATENT DOCUMENTS

| | | |
|---|---|---|
| EP | 2965987 A1 | 1/2016 |
| WO | 2014/090763 A2 | 6/2014 |

\* cited by examiner

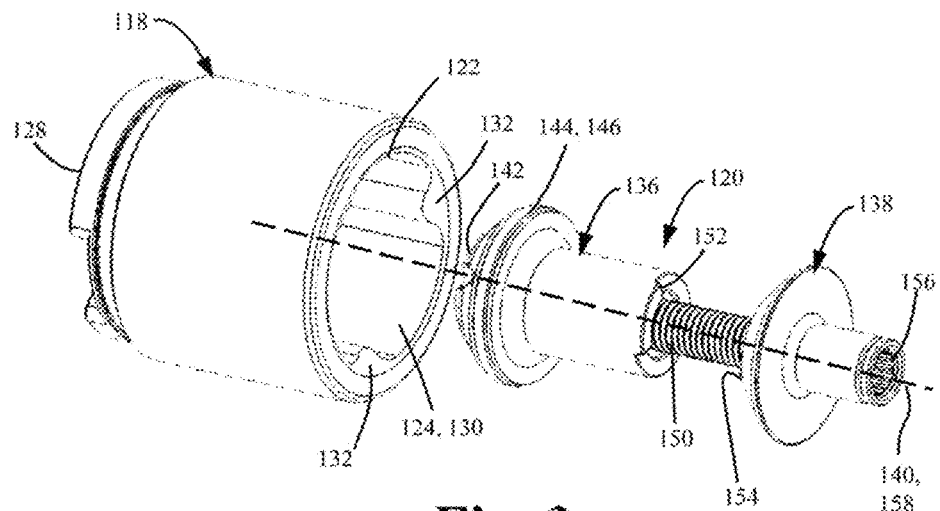
*Fig. 3*
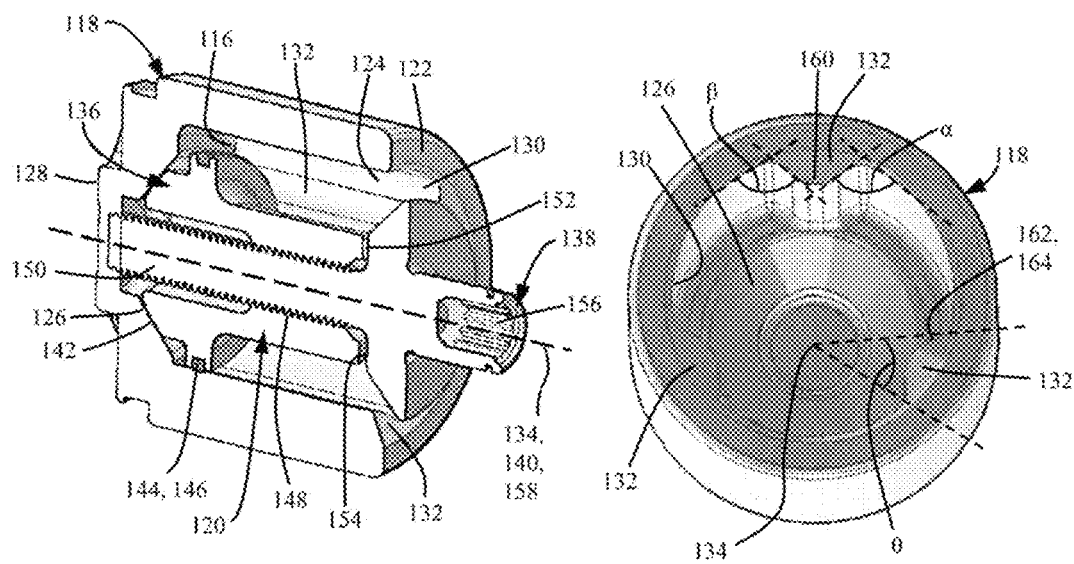
*Fig. 4*     *Fig. 5*

BRAKE PISTON

This disclosure claims the benefit of U.S. Provisional Patent Application No. 62/263,198 filed on Dec. 4, 2015 the disclosure of which is hereby incorporated by reference herein in its entirety for all purposes.

FIELD

These teachings relate generally to a brake piston, and more particularly to a brake piston and linkage for moving the brake piston during a parking brake apply and during release of the parking brake.

BACKGROUND

A brake system may be used to decelerate or restrict movement of a vehicle. A disc brake system is a common type of brake system. During a standard brake apply in a disc brake system, fluid is pressurized, which causes one or more brake pistons to move one or more brake pads against a brake rotor to create a clamping force. The clamping force may function to decelerate or restrict movement of the vehicle. To release the brake apply and/or release the clamping force, the fluid is depressurized and, accordingly, the one or more brake pistons and brake pads move away from the brake rotor. Once released, the vehicle is free to move again.

A parking brake system may utilize one or more components of the brake system to maintain a vehicle in a stopped or parked position. In modern applications, the parking brake system may be an electromechanical system. An exemplary electromechanical parking brake system includes one or more motor gear units and one or more linkages. A linkage may comprise a spindle and a nut. The nut may be keyed to an inner portion of a brake piston (i.e., to a piston pocket) so that the nut and the brake piston are restricted from independently rotating relative to one another.

During a parking brake apply in an exemplary electromechanical parking brake system, the motor gear unit may rotate the spindle in a first direction, which may cause the nut to translate axially and push the corresponding brake piston towards and eventually into contact with one of the brake pads to develop the clamping force to maintain the vehicle in a stopped or parked position. To release the parking brake and/or the clamping force, the motor gear unit may rotate the spindle in an opposite direction so that the nut and the corresponding brake piston move away from the brake pad so that the brake pads can move away from the brake rotor so that the vehicle is free to move again.

While the aforementioned parking brake system has proven satisfactory, opportunities for improvement may exist. For example, because the nut is keyed to the inner portion of the brake piston, properly aligning the nut with the brake piston during assembly can be time-consuming and cumbersome. Also, for example, during release of the parking brake, once the nut can no longer axially move (i.e., once the nut and the spindle thread stop make contact), further rotation of the spindle by the motor gear unit may undesirably cause the nut to rotate the brake piston, which may tear or otherwise damage the piston boot That surrounds the brake piston. Moreover, for example, damage may occur to the motor gear unit, the linkage, or both if the motor gear unit continues to rotate the spindle, but the nut is restricted from axially moving.

Accordingly, it may be desirable to have an improved parking brake system, an improved brake piston, an improved linkage, or a combination thereof. It would be attractive to have a nut that is not keyed to an inner portion or pocket of the brake piston, but can still be used to develop the clamping force necessary to maintain a vehicle in a stopped or parked position. It may be desirable to have a spindle and a nut that can be quickly and easily assembled together. It may be attractive to have a nut that is not keyed to an inner portion of the brake piston so that assembly time of the nut and the brake piston can be improved. It may be attractive to have a nut that is not keyed to an inner portion of the brake piston but is still restricted from rotating within the inner portion of the brake piston during a parking brake apply and/or during release of the parking brake. It may also be attractive to have a nut that can be restricted from rotating within the inner portion of brake piston when there is no clamping force or while the clamping force is being created, but allowed to rotate therein once the frictional engagement between the spindle and the nut is greater than the frictional engagement between the nut and the piston pocket, or, preferably, between a nut seal and an inner pocket wall.

SUMMARY

The present teachings provide an improved brake system, at improved parking brake system, or both. More specifically, the present teachings provide improved components for a brake system, a parking brake system, or both. Even more specifically, provided is an improved brake piston and an improved linkage for a brake system, a parking brake system, or both.

The brake piston can be used during standard braking to decelerate or restrict movement of a vehicle. The brake piston can also be used during a parking brake apply to maintain the vehicle in a stopped or parked position. The brake piston includes a piston pocket. The piston pocket includes an inner pocket wall. The inner pocket wall may be substantially smooth. Alternatively, the inner pocket wall may include one or more projections or, preferably, two or more projections, which may extend longitudinally from an opening to the piston pocket to a bottom pocket surface. The linkage is comprised of a nut and a spindle. The nut includes a nut seal that frictionally engages the substantially smooth inner pocket wall, the protections, or both.

During a parking brake apply, the nut can be axially moved toward a bottom pocket surface without rotating. During release of the parking brake, the nut can be axially moved away from the bottom pocket surface without rotating. When little or no clamping force exists (i.e., during the initial creation of the parking brake apply and/or during release of the parking brake) the motor gear unit rotates the spindle, which causes the nut to move axially without rotating. The nut may be restricted from rotating due to the torque or frictional engagement between the nut seal and the inner pocket wall, the nut seal and the one or more projections, or both being greater than the torque acting on the nut from the spindle.

During a parking brake apply, rotation of the spindle in an apply direction may cause the nut to move axially in an apply direction until the nut contacts the bottom pocket surface. After contact between the nut and the bottom pocket surface is made, further rotation of the spindle causes the nut to move or push the brake piston, which in turn moves or pushes the brake pads towards the brake rotor. The motor gear unit continues rotating the spindle so that the brake piston and the brake pads are moved or pushed against the brake rotor until a desired clamping force is developed to park the vehicle. During release of the parking brake, the torque from the frictional engagement between the nut seal and the inner pocket surface, the projections, or both may be greater than the torque of the spindle and the nut. Accordingly, rotation of the spindle in the release direction causes the nut to move axially in the release direction, rather than the nut rotating. Continued rotation of the spindle in the release direction causes the nut to move axially away from the (now) stationary brake piston until the clamping force is fully released.

There may be a condition, however, where the nut rotates in the piston pocket. This condition may occur when the nut or an abutment of the nut contacts the spindle thread stop. This contact may occur when worn brake pads are to be replaced with new brake pads, and/or when the brake caliper is to be removed from the knuckle or support of a vehicle. Contact between the nut and the spindle thread stop may occur when the spindle is rotated in a release direction and the nut is moved away from the piston pocket bottom surface until the nut contacts the spindle thread stop. If the nut or the nut abutment contacts the spindle thread stop, and the motor gear unit continues to rotate the spindle, the torque due to frictional engagement between the nut seal and the piston pocket may be less than the torque of the motor gear unit, the spindle, and the nut. Accordingly, during this condition, the nut may rotate within the piston pocket. Because the torque due to the frictional engagement between the outer surface of the brake piston and the piston boot surrounding the brake piston may be greater than the torque due to the frictional engagement between the motor gear unit, the spindle, and the nut, if the nut were not allowed to rotate in the piston pocket, the brake piston would try to rotate in the piston boot, which may cause damage to the piston boot. Thus, by the nut rotating in the piston pocket during this condition when the nut contacts the spindle thread stop, damage to the brake piston can be prevented.

The present teachings also provide a brake piston that comprises a piston pocket. A nut is received in the piston pocket. The nut according to the teachings herein is axially moveable along a center axis of the brake piston. The nut according to the teachings herein is not keyed to the piston pocket. This means that the nut can be quickly and easily installed in the piston pocket without requiring the nut to be rotationally aligned relative to the piston pocket before installing the nut as may be the case in designs where the nut is keyed to a specific rotational position of the piston pocket. The nut includes a nut seal that frictionally engages the piston pocket so that the nut is restricted from rotating within the piston pocket during a parking brake apply and during release of the parking brake. However, the nut may be rotatable within the piston pocket during a condition where a nut abutment contacts the spindle thread stop and the spindle continues to be rotated.

The present teachings also provide a disc brake system comprising a brake caliper that supports a brake piston according to the teachings herein. During a parking brake apply, the nut is axially moved along the center axis towards a bottom pocket surface of the piston pocket until a first abutment of the nut contacts the bottom pocket surface. After contact, to create a clamping force, the nut continues to be moved axially when the spindle is rotated thus moving the brake piston and a brake pad against a brake rotor.

The present teachings also provide a brake system. The brake system comprises a brake piston including a piston pocket, a nut, a nut seal, and a spindle in communication with the nut. The nut seal is received into a seal groove formed around the nut. The nut seal and the corresponding seal groove in the brake piston may be any suitable shape. For example, the nut seal and the seal groove may have a circular shape or a square shape. The nut is received into the piston pocket such that an interference fit is created between the nut seal and the piston pocket, an inner pocket surface, one or more projections, or a combination thereof. During a parking brake apply, or release of the parking brake apply, the spindle is rotated with a motor gear unit, which causes the nut to move axially without rotating within the piston pocket. During release of the parking brake apply, when the nut contacts the spindle thread stop and the motor gear unit continues to rotate the spindle, the nut can rotate within the piston pocket.

BRIEF DESCRIPTION OF THE DRAWINGS

FIG. 3 is a perspective, exploded view of a brake piston, a nut, and a spindle.

FIG. 4 is an assembled, perspective, cross-sectional view of the brake piston, nut, and spindle of FIG. 3.

FIG. 5 illustrates a perspective, front view of the brake piston of FIG. 3.

DETAILED DESCRIPTION

Figure 1:
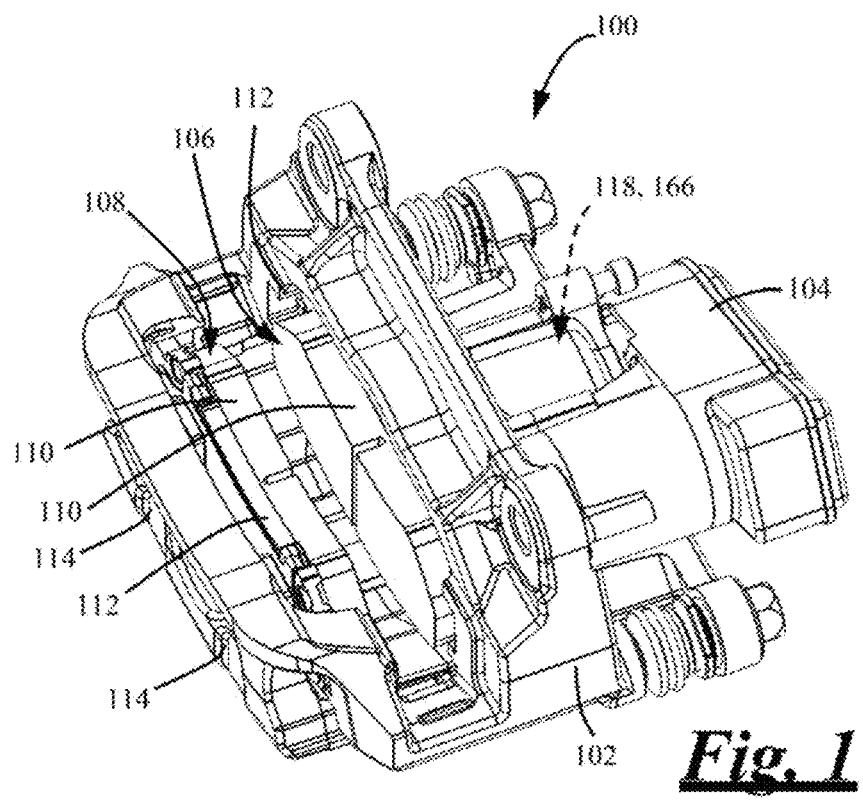
FIG. 1 is a perspective view of a brake caliper.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings are predicated upon providing an improved brake system, an improved parking brake system, or both. More particularly, the description herein relates to improved components for a brake system, a parking brake system, or both. The present teachings may be used with a brake system and/or a parking brake system in any vehicle. For example, the teachings herein can be used in any size car, truck, bus, train, airplane, all terrain vehicle, etc. The present teachings may also be used in non-vehicular applications. For example, the teachings herein may be applied to brake systems used in various machines, such as a lathe, a winder for paper products or cloth, amusement park rides, wind turbines, or the like.

The brake system may be any device, system, and/or assembly that may create a clamping force. The clamping force may be any force that is sufficient to slow or prevent movement or rotation of a brake rotor; decelerates and/or prevents movement of a vehicle; or both. The clamping force may be created during a brake apply, a parking brake apply, or both. Exemplary brake systems include opposing brake systems (i.e., a fixed caliper brake systems) and floating brake systems (i.e., a floating calipers). The brake system may generally include a brake rotor, one or more brake pads, and a brake caliper supporting one or more brake pistons.

The brake rotor may cooperate with the components of the brake system, the components of the parking brake system, or both to create the clamping force. The brake rotor may be generally circular, and may extend through the brake caliper; may be partially surrounded by the brake caliper; or both. The brake rotor may rotate with a wheel and axle of a vehicle when the vehicle is in motion. The brake rotor may include an inboard side and an opposing outboard side. One or more brake pads may be supported on the brake caliper facing the inboard side of the brake rotor, and one or more brake pads may be supported on the brake caliper facing the outboard side of the brake rotor. To create the clamping force during a brake apply or during a parking brake apply, the friction material of the one or more brake pads may be moved against at least one of the sides of the brake rotor. After the one or more brake pads are moved against the brake rotor (i.e., once the clamping force is created), the brake rotor may be restricted from rotating, and, accordingly, the vehicle may decelerate and/or may be restricted from moving. After the friction material of the one or more brake pads is moved away from the brake rotor and thus the clamping force is released, the brake rotor can once again rotate, and, accordingly, the vehicle may move.

During a brake apply, a parking brake apply, or both the one or more brake pads may be moved or pushed against the brake rotor to create, the clamping force. The clamping force acts to maintain a stationary vehicle at rest or acts to decelerate a moving vehicle by, converting kinetic energy of a vehicle into thermal energy. The one or more brake pads may include one or more ears or projections. The one or more ears or projections may engage a brake caliper, a support bracket, or both. The one or more brake pads may include a friction material and a pressure plate. The one or more brake pads may be supported on the brake caliper so that the friction material faces a side of the brake rotor. The friction material may include one or more materials that are non-metallic, semi-metallic, fully metallic, and/or ceramic. The friction material may be slotted and/or may include grooves. The pressure plate may oppose the friction material. The one or more brake pistons and the one or more brake caliper fingers may be in selective contact with the pressure plate of a corresponding brake pad. For example, one or more brake pistons may be in selective contact with a pressure plate of a brake pad located on the inboard side of the brake rotor, and one or more brake caliper fingers may be in contact with the pressure plate of a brake pad located on the outboard side of the brake rotor. During a brake apply and/or during a parking brake apply, the one or more brake pistons and/or the one or more brake caliper fingers can be moved so that all or an end of a corresponding brake pad is moved against the brake rotor to create the clamping force.

The brake caliper may function to support one or more components of the brake system, the parking brake system, or both. The brake caliper may provide for the movement of one or more brake pads, or, preferably, two or more brake pads relative to the brake rotor. The brake caliper may include one or more supports configured to engage and/or support the one or more brake pads. The brake caliper may move during a brake apply (i.e., a floating caliper), or the brake caliper may be fixed so that the brake caliper does not move during a brake apply (i.e., a fixed caliper). The brake caliper may be connected to a knuckle or a support structure of a vehicle.

The brake caliper may include one or more caliper bores. The one or more caliper bores may be one or more hollow regions in the brake caliper configured to support a corresponding brake piston. The one or more caliper bores may be any shape. Preferably, the shape of the one or more caliper bores corresponds to the shape of a corresponding brake piston. Preferably, the one or more caliper bores are cylindrically-shaped. A brake piston may be supported within a respective caliper bore, and during a brake apply or release, a parking brake apply or release, or a combination thereof may be moved along a caliper bore axis. The caliper bore axis may extend generally perpendicular to a side of the brake rotor, a pressure plate of a brake pad, or both. The caliper bore axis may be the same as, or at least collinear with a brake piston axis, a nut axis, a spindle axis, or a combination thereof.

A piston seal may be located between an outer surface of the brake piston and the caliper bore. The piston seal may be located in a seal groove machined into the brake caliper or caliper bore. The piston seal may support the brake piston within the caliper bore. An interference fit may be formed between the outer surface of the brake piston and the piston seal so that fluid leakage can be prevented. The piston seal may function to restrict or prevent the brake piston from rotating. That is, the torque due to the frictional engagement between the piston seal and the outer surface of a corresponding brake piston may be greater than the torque due to the frictional engagement between the nut seal and an inner pocket wall so that a brake piston does not rotate within a corresponding piston boot. Alternatively, or in addition, the torque due to the frictional engagement between the piston seal and the outer surface of a corresponding brake piston may be greater than the torque due to the frictional engagement between the motor gear unit, the spindle, and the nut so that the brake piston does not rotate within a corresponding piston boot. By preventing the brake piston from rotating, damage to the piston boot can thus be prevented. The piston seal, the seal groove, or both may be substantially similar to, and/or may function in a manner similar to the seal and seal groove disclosed in Applicant's commonly owned US Patent Application Publication Number US 2013/0081910A1 published Apr. 4, 2013, the disclosure of which is hereby incorporated by reference herein for all purposes.

The brake caliper may include one or more piston boots. The one or more piston boots may prevent dust, moisture, and/or other debris from entering the one or more caliper bores. The one or more piston boots may prevent dust, moisture, and/or other debris from entering between the outer surface of the brake piston and the caliper bore. The one or more piston boots may support a corresponding brake piston. The one or more piston boots may be bellows. The one or more piston boots may allow axial movement of a corresponding brake piston in and out of a corresponding caliper bore while preventing debris or moisture from entering between the piston and the caliper bore. The one or more piston boots may be attached to the brake caliper in the area of the caliper bores, to an outer surface of a corresponding brake piston, or both. The one or more piston boots may be fabricated from any suitable material. Preferably, the one or more piston boots are fabricated from a flexible material so that the piston boots can move, flex, bend, and/or deform when a corresponding brake piston is moved in and out of the caliper bore without tearing or otherwise damaging the piston boot.

The brake caliper may support one or more brake pistons. During a brake apply, a parking brake apply, or both, the one or more brake pistons may be moved, which may thus move the one or more brake pads against the brake rotor to create the clamping force. Preferably, the one or more brake pistons may be moved along a piston axis, which may be the same as, or at least generally collinear with a corresponding caliper bore axis, brake piston axis, nut axis, spindle axis, or a combination thereof. The one or more brake pistons may be any shape. Preferably, the shape of the one or more brake pistons generally corresponds to the shape of a corresponding caliper bore. More preferably, each of the one or more brake pistons may be cylindrically-shaped. Preferably, the one or more brake pistons do not rotate about the piston axis. Preferably, the one or more brake pistons are prevented from rotating within the respective piston boots by instead providing for the corresponding nut to rotate within the piston pocket after the nut contacts the spindle thread stop and the motor gear unit continues to rotate the spindle. The one or more brake pistons may include an outer brake piston surface. The outer brake piston surface may be generally smooth. The outer brake piston surface may be in sliding contact or communication with a corresponding caliper bore. The outer brake piston surface may be in sliding contact and/or have an interference fit with a corresponding piston seal. The interference fit may be sufficient to create a torque that is greater than the torque due to the frictional engagement between the nut and the piston pocket; and/or between the motor gear unit, spindle, and nut so that the brake piston is restricted from rotating. The one or more brake pistons may include an outer end surface. The outer end surface may be selectively engaged and/or pressed against a pressure plate of a brake pad (i.e., an inboard brake pad) during a brake apply, a parking brake apply, or both.

One or more brake pistons may include a piston pocket. The one or more piston pockets may function to receive fluid, a linkage, or both. The piston pocket may be a cup or recess formed into an end of the brake piston. Preferably, the piston pocket is formed into an open end of the brake piston and extends into the brake piston towards a bottom pocket surface. Alternatively, the piston pocket may be a core or channel extending through both ends of a brake piston. Preferably, the piston pocket is a generally open space defined between the outer brake piston surface, the outer end surface, and an open end. An inner pocket wall may cooperate with the outer bake piston surface to define a wall thickness therebetween. In some configurations, the inner pocket wall may have an interference fit with a nut seal or fingers of a nut seal that is sufficient to prevent the nut from rotating during a brake apply, a parking brake apply, a brake release, and/or release of the parking brake. This may be due to the interference fit between the nut seal and/or fingers and the inner pocket wall, the projections, or both may be greater than a torque due to an input torque on the spindle or nut. However, during release of the parking brake, if the nut, or an abutment of the nut (i.e., "second abutment) contacts the thread stop, and the motor gear unit continues to rotate the spindle in a release direction, the torque due to frictional engagement between the nut seal and/or fingers and the inner pocket wall may be less than the torque of the motor gear unit, the spindle, and the nut. Accordingly, in this condition, when the input torque at the nut is greater than a torque due to the frictional engagement of the nut seal and the piston pocket, the nut may rotate within the brake piston. However, the brake piston may be restricted from rotating because the torque due to the frictional engagement between the outer brake piston surface and the piston seal may be greater than the torque due to the motor gear unit, the spindle, and the nut. A bottom pocket surface may oppose the outer end surface and may define a wall thickness therebetween. Through the open end, each of the one or more piston pockets may receive fluid, a linkage, or both.

In some configurations, the piston pocket may include one or more projections. The one or more projections may function to create an interference fit with a nut seal. The interference fit may be sufficient to prevent the nut from rotating within the piston pocket during a brake apply, a parking brake apply, a brake release, and/or release of the parking brake. However, during release of the parking brake, if the nut or a nut abutment contacts the thread stop, and the motor gear unit continues to rotate the spindle, the torque due to frictional engagement between the nut seal and the projections may be less than the torque of the motor gear unit, the spindle, and the nut. Accordingly, in this condition, the nut may rotate within the brake piston.

Figure 7:
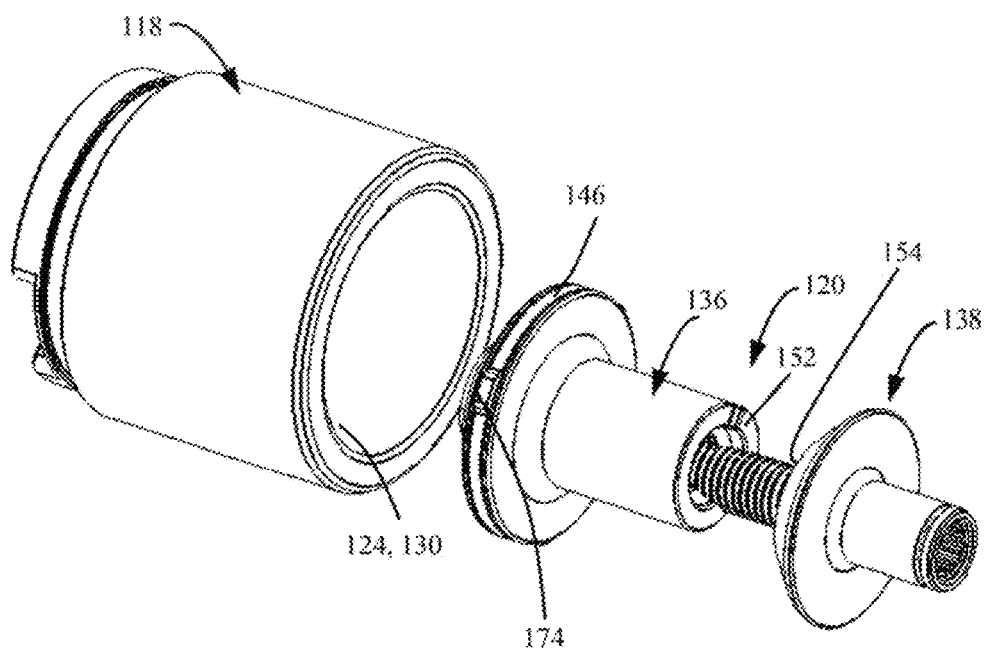
FIG. 7 is a perspective, exploded view of a brake piston, a nut, and a spindle.

The one or more projections may form gaps between the inner pocket wall and the nut seal so that air bubbles can be evacuated during fluid bleeding. In some configurations, gaps may also be formed between the inner pocket wall and the nut seal if the nut seal has a shape that is not circular (e.g. square, irregular, or the like) of if the nut seal has nubs, bumps, or projections and/or recesses between the nubs, bumps or projections as shown in FIG. 7, for example.

The one or more projections may extend from the inner pocket wall towards a center piston axis. The one or more projections may extend substantially parallel to the brake piston axis, a nut axis, a spindle axis, a caliper bore axis, or a combination thereof. The one or more projections may extend along the inner pocket wall from the bottom pocket surface to the open end. Alternatively, the one or more projections may have a length that extends somewhere between the aforementioned ends. The one or more projections may have any suitable shape or cross section. Preferably, the one or more projections have a generally rounded cross section; however, a square or even a triangular cross section may be suitable. The one or more projections may have a shape or cross section that is generally linear or straight, or may be arcuate shaped, zig-zag shaped, and/or irregularly shaped. The one or more projections may be helically wrapped around the inner pocket wall; circumferentially wrapped around the inner pocket wall; irregularly wrapped around the inner pocket wall; or wrapped around the inner pocket wall in any other suitable pattern or orientation.

The one or more projections may include any suitable number of projections. For example, the one or more projections may include one or more projections, two or more projections, or preferably three or more projections. The one or more projections may include ten or fewer projections, eight or fewer projections, five or fewer projections, or preferably four or fewer projections.

Each of the one or more of the projections may have an area or point on the inner pocket wall that is created at an intersection between an edge of a corresponding projection and the inner pocket wall. The one or more of the projections may have any suitable angle $\alpha$, $\beta$, when measured from the area or point between a line tangent to the inner pocket wall at the point and the line on the projection. Each of the one or more of the projections may have an area at the apex or tip of the projection. The area may be in contact with the nut seal. Preferably, a chamfer may be added to the area on the projection so that the nut seal is not compromised (i.e. cut, ripped, torn, destroyed, etc.) by one or more projections. This may be preferred if the nut rotates within the piston pocket in the condition when the nut contacts the spindle thread stop and the motor gear unit continues to rotate the spindle. Angle α, β between the point and the inner pocket wall may be the same for all of the projections, or the angle may differ there amongst. An angle θ may also be formed at the intersection of each projection wall with the inner pocket wall relative to the piston axis. The angle θ may be the same for all projections or may vary there amongst. For example, one or more of the angles α, β, and/or θ may be on the order of approximately 5 degrees or more, 10 degrees or more, preferably 15 degrees or more 30 degrees or more, or even 40 degrees or more. The angles α, β, and/or θ on the order of approximately 90 degrees or less, 75 degrees or less, 60 degrees or less, 45 degrees or less. In some instances, however, a point or tangent of the one or more projections may contact the nut seal. This may be the case if the nut seal is fabricated from a material that is not as complaint as a nut seal that is fabricated from a suitable compliant material such as rubber, for example.

As was described above, to prevent the nut from rotating, a sufficient torque or interference fit between the inner pocket wall, the one or more projections, or both and the nut seal is desired. Therefore, a sufficient ratio of a radial piston pocket dimension to a radial nut seal dimension may be preferred. The radial piston pocket dimension may be a value measured from the center piston axis to a tip of the one or more projections. The radial nut seal dimension may be a value measured from a center of the nut seal to an outer edge thereof. Preferably, a difference between the radial piston pocket dimension and the radial nut seal dimension is less than a thickness of the nut seal to ensure a sufficient interference lit.

As was previously described, to prevent the nut from rotating, it may be preferred that the torque or frictional engagement between the nut seal and the one or more projections, the inner pocket wall, or both is greater, than the torque due to the frictional engagement between the motor gear unit, the spindle, and the nut. If the frictional engagement between the motor gear unit, the spindle and the nut is greater than the frictional engagement between the nut seal and the one or more projections, the inner pocket wall, or both, the nut may rotate within the piston pocket. This may occur if the nut contacts the spindle thread stop after the spindle and nut have been fully moved in a release direction. If the nut contacts the spindle thread stop and the motor gear unit continues to rotate the spindle, the nut may rotate within the piston pocket. In this condition, the frictional engagement between the nut seal and the projections and/or the inner pocket wall may be less than a torque applied to the spindle by the motor gear unit so that the nut can rotate within the brake piston. Moreover, preferably, the torque due to the frictional engagement between the outer surface of the brake piston and the piston seal is greater than the frictional engagement due to the input torque applied to the spindle or nut by the motor gear so that the brake piston does not rotate. If the brake piston were to rotate in a corresponding caliper bore, the piston hoot surrounding the brake piston may tear or may be otherwise damaged.

Preferably, during release of the parking brake, the nut may be axially moved in a release direction a suitable distance that is sufficient to fully release the clamping force plus a sufficient additional distance to generate a gap between a bottom pocket surface and the nut first abutment. For example, the gap distance may be on the order of approximately 0.1 mm or more, approximately 0.2 mm or more, approximately 0.4 mm or more, preferably about 0.5 mm or more. The gap distance may be on the order of approximately 1.5 mm or less, approximately 1.3 mm or less, or preferably about 1.0 mm or less. Preferably, the gap is between about 0.5 mm and 1.0 mm.

The one or more motor gear units may be any device or combination of devices that may generate and/or transfer a three or torque that is suitable for creating and/or releasing a clamping force. During a parking brake apply, the one or more motor gear units may generate a torque that is sufficient to move the one or more brake pistons, the one or more brake pads, or both relative to the brake rotor to create a clamping force. During release of the parking brake, the one or more a torque applied to the spindle by the motor gear may generate a torque that is sufficient to move the one or more brake pistons away from the one or more brake pads to release the clamping force. The one or more a torque applied to the spindle by the motor gear may generate a torque that is sufficient to hold the one or more brake pistons against the one or more brake pads once a clamping force has been created. The one or more a torque applied to the spindle by the motor gear may include a motor. The motor may function to generate torque. The motor may be any suitable motor. For example, the motor may be a DC motor, a series wound motor, a shunt wound motor, a compound wound motor, a separately exited motor, a servomotor, or a permanent magnet motor. The one or more a torque applied to the spindle by the motor gear may include one or more gears that may function to transfer, increase, and/or decrease an output force or torque generated by the motor. At least a portion of the torque applied to the spindle by the motor gear may be contained within a housing that may be integrally formed with the brake caliper; removably attached to the brake caliper; permanently attached to the brake caliper; or attached in any suitable way to the vehicle.

An output of a torque applied to the spindle by the motor gear may be in communication with the one or more linkages. The one or more linkages may function to transfer torque applied to the spindle by the motor gear to one or more brake pistons. More specifically, the one or more, linkages may function to transfer a torque from the torque applied, to the spindle by the motor gear into a linear or axial force to move a corresponding brake piston along the brake piston axis towards or away from a corresponding brake pad. The one or more linkages may be any device that may perform one or more of the aforementioned functions. For example, the one or more linkages may be high efficiency devices, low efficiency devices, or a combination of both. For example, the one or more linkages may include a lead screw and nut assembly, a ball screw and ball nut assembly, or both. Each of the one or more linkages may generally include a spindle and a nut.

The one or more spindles may function to transfer a torque from the motor gear to a nut so that the corresponding nut, brake piston, and/or brake pad moves against the brake rotor to create the clamping force and/or the parking brake apply. The one or more spindles may function to transfer a torque from the motor gear to a nut so that the corresponding nut, brake piston, and/or brake pad moves away from the brake rotor to release the clamping force and/or the parking brake apply. Each of the one or more spindles may have an input portion that is in communication with the motor gear, and an output portion that is in communication with a corresponding nut. The input portion may receive torque from the motor gear, or from a component or linkage in communication with the motor gear unit. For example, the input portion may receive torque from one or more worm wheels, output shafts, etc. in communication with the motor gear unit. The input portion may include any suitable connection for connecting the spindle with the motor gear unit or a component or linkage of the motor gear unit. For example, the connection may include a threaded engagement, a friction engagement, an interference engagement, or a combination thereof. The input portion may be coupled to the motor gear unit or a component or linkage of the motor gear units with one or more mechanical fasteners. Preferably, the connection is keyed (i.e., may include, teeth, gears, notches, grooves, etc.). The motor gear units may rotate the spindle about a spindle axis, which may be the same as, or at least collinear with a brake piston axis, a caliper bore axis, a nut axis, or a combination thereof.

The output portion of the spindle may be in communication with a corresponding nut. The output portion may include any suitable connection for connecting with the nut. For example, the output portion may engage a corresponding nut with a threaded engagement, a sliding engagement, an interference engagement, a permanent engagement, a removable engagement, a keyed engagement, or a combination thereof. Preferably, the connection between the output portion of the spindle and the nut is threaded. More preferably, the output portion is a male threaded portion, and the nut includes a female threaded portion.

One or more of the spindles may include a spindle thread stop. The spindle thread stop may function to prevent a spindle and a corresponding nut from binding. The spindle thread stop may prevent damage to the brake piston, the piston boot, the motor gear unit, or a combination thereof. That is, during release of the parking brake, the motor gear unit may rotate the spindle in a particular direction (e.g., in a release direction) so that the corresponding nut axially moves away from the bottom pocket surface and thus the brake pad can both move away from the brake rotor to release the clamping force. Once the nut engages the spindle thread stop, the nut may be in its furthest position away from the bottom pocket surface. Because the nut can no longer axially move, further rotation of the spindle may cause the nut to rotate within the piston pocket rather than the brake piston rotating in a corresponding caliper bore, piston boot or piston seal, or both. To do so, the frictional engagement between the nut seal and the inner pocket wall, the one or more projections, or both should be less than the torque of the motor gear unit, the spindle and/or the nut. Preferably, the frictional engagement between the piston seal and the outer surface of the brake piston is greater than the frictional engagement between the torque of the motor gear units and the spindle so that the piston does not rotate. Accordingly, risk of damaging the piston, the piston seal, the piston boot, or the like is reduced when the nut is rotated in the piston pocket vs. the piston rotating in the caliper bore. In some configurations, the motor gear units may be in communication with an electronic control unit (ECU). The ECU may be programmed with software or an algorithm; and/or any other system or device may be used to restrict or prevent the nut from even contacting the spindle thread stop.

The one or more nuts may cooperate with a corresponding spindle to move a corresponding brake piston. That is, each of the one or more nuts may be in communication with a corresponding brake piston, and may function to transfer torque received from a corresponding spindle, motor gear unit, or both, into a linear force to move the brake piston along a piston axis. In other words, rotation of a spindle may cause the corresponding nut to move axially along a nut axis. The nut axis may be the same as the caliper bore axis, the brake piston axis, a spindle axis, or a combination thereof, or may at least be collinear with at least one of the axis. Each of the one or nuts may engage an output portion of a corresponding spindle in any suitable manner. For example, a nut may engage a corresponding output portion with a threaded engagement, a sliding engagement, an interference engagement, a permanent engagement, a removable engagement, a keyed engagement, or a combination thereof. Preferably, the connection between the output portion of one of the spindles and corresponding nut is threaded.

Each of the one or more nuts may include one or more nut seals. During a parking brake apply, release of the parking brake, or both, the engagement between the one or more nut seals and the inner pocket wall, the one or more projections, or both may be sufficient to at least partially restrict a corresponding nut from rotating. More specifically, during a parking brake apply, the torque of a frictional engagement of the nut seal against the inner pocket wall, the projections, or both may be greater than the torque of the motor gear unit, the spindle, and the nut. Accordingly, during a parking brake apply, rotation of the spindle in an apply direction causes the nut to axially move along the nut axis towards the bottom pocket surface rather than rotate. Instantly after the parking brake is released and the clamping force is eliminated, the torque due to the frictional engagement of the nut seal against the inner pocket wall, the projections, or both may be greater than the torque of a frictional engagement between the spindle, and the nut. Thus, rotation of the spindle in the release direction causes the nut to axially move along the nut axis away from the bottom pocket surface rather than rotate. Accordingly, the motor gear unit can be protected from stalling, and the brake piston can be prevented from rotating in the caliper bore thus preventing damage to a piston boot. During release of the parking brake, if the nut, or an abutment of the nut contacts the spindle thread stop, and the motor gear unit continues to rotate the spindle, the torque due to frictional engagement between the nut seal and the inner pocket wall, the one or more projections, or both may be less than the torque of the motor gear unit, the spindle, and the nut so that the nut rotates within the piston pocket. When the nut rotates within the piston pocket, the nut generally does not generally axially move.

The engagement between the one or more nut seals and the projections, the inner pocket wall, or both may also function to center or align the nut, the spindle, the linkage, or a combination thereof relative to the piston. That is, the engagement may align and/or maintain alignment between the piston axis and a spindle axis, a nut axis, or a combination thereof.

The nut seal may be connected to the nut, a nut groove on the nut, or both so that the nut seal does not move or rotate relative to the nut. For example, the nut seal may be over molded on the nut. For example, the nut seal may be attached to the nut or nut groove with a sufficient fastener, such as an adhesive, so that the nut seal does not move relative to the nut or the nut groove. In some configurations, the nut seal may be installed on the nut or in the nut groove with an interference fit so that the nut seal does not move or rotate relative to the nut. In these types of configurations where the nut seal does not move or rotate relative to the nut, during a release of the parking brake when the nut contacts the spindle thread stop, an input torque applied at the nut by the spindle via the motor gear unit may sufficient to overcome a torque due to the frictional engagement of the nut seal against the inner pocket wall and/or projections. Therefore, rotation of the spindle causes the engagement of the nut seal with the brake piston to 'slip' so that both the nut and the nut seal rotate together with the spindle relative to the brake piston. During this condition, the brake piston remains stationary due to the piston seal sufficiency engaging an outer surface of the brake piston and preventing the brake piston from rotating.

In other configurations, the nut may be adapted or configured to 'slip' and rotate relative to a nut seal that remains stationary. In this type of configuration, during a release of the parking brake when the nut contacts the spindle thread stop, the torque due to the frictional engagement between the nut seal and the inner pocket wall and/or projections is greater than the torque due to the frictional engagement between the nut seal and the nut or the groove in which the nut seal is received. Therefore, rotation of the spindle by the motor gear unit will cause only the nut to rotate with the spindle, while the nut seal remains frictionally engaged with and stationary relative to the brake piston. During this condition, the brake piston remains stationary due to the piston seal sufficiency engaging an outer surface of the brake piston and preventing the brake piston from rotating.

The nut may include a flange on which or over which the nut seal is installed. The nut seal groove may be located on the flange. The flange may be generally circular. The flange may be generally square. The flange may be generally square with edges or corners that are have an arc or a radius. The arc or radius may be slightly smaller than the piston pocket. During a manufacturing process, the flange may start off generally square, and an arc or radius may be added to the corners. The flange may be generally circular with sides that are generally flat. During a manufacturing process, the flange may start off generally round, and flats may be created or added during a subsequent process giving the flange a generally square shape. The nut seal may be formed from any suitable material. For example, the nut seal may be fabricated from an at least partially complaint and/or deformable material so that the nut seal at least partially deforms in the areas of engagement with the one or more projections. The deformation may be temporary, or permanent, especially over time. The one or more nut seals may have any suitable shape. For example, the nut seal may be generally round, or may be square. The nut seal may be generally round, but after the generally round nut seal is installed over a nut that has a shape that is other than round, the nut seal may conform to that shape. For example, a round nut seal may become generally square when installed on a nut that has a generally share shape.

The nut seal may have a constant or uniform thickness, or the thickness may vary. For example, the nut seal may have one or more projections that may be nubs bumps, raised portions, thickened areas, or a combination thereof. The one or more projections may be disposed at regular or irregular intervals around a perimeter or circumference thereof. The one or more projections may engage the inner pocket wall. One or more gaps, grooves, cutouts, thinned-out areas, or a combination thereof may be defined between the projections around the nut seal. One or more gaps may be formed between the inner pocket wall and the one or more gaps defined between the projections so that air bubbles can be released during fluid evacuation. The projections may be disposed around a circumference or perimeter at equal or unequal intervals. For example, the projections may be located 180 degrees or more apart, 90 degrees or more apart, 60 degrees or more apart, 45 degrees or more apart, 30 degrees or more apart. For example, the projections may be located 180 degrees or less apart, 90 degrees or less apart, 60 degrees or less apart, 45 degrees or less apart, 30 degrees or less apart. The nut seal may include any suitable number of projections. For example, the nut seal may include one or more projections, two or more projections, three or more projections, four or more projections, five or more projections, eight or more projections, ten or more projections. For example, the nut seal may include twenty or less projections, fifteen or less projections, twelve or less projections, ten or less projections.

FIG. 1 illustrates a brake caliper assembly 100. The brake caliper assembly 100 includes a brake caliper 102 and a motor gear unit 104. The brake caliper 102 supports an inner brake pad 106 and an outer brake pad 108. Each brake pad 106, 108 comprises a friction material 110 and a pressure plate 112. A brake rotor is located between the friction material 110 of both brake pads 106, 108. The brake caliper 102 includes brake caliper fingers 114 in contact with the pressure plate 112 of the outer brake pad 108. A brake piston 118 is located, in a caliper bore 166 of the brake caliper 102. The brake piston 118 is in selective contact with the pressure plate 112 of the inner brake pad 106.

Figure 2:
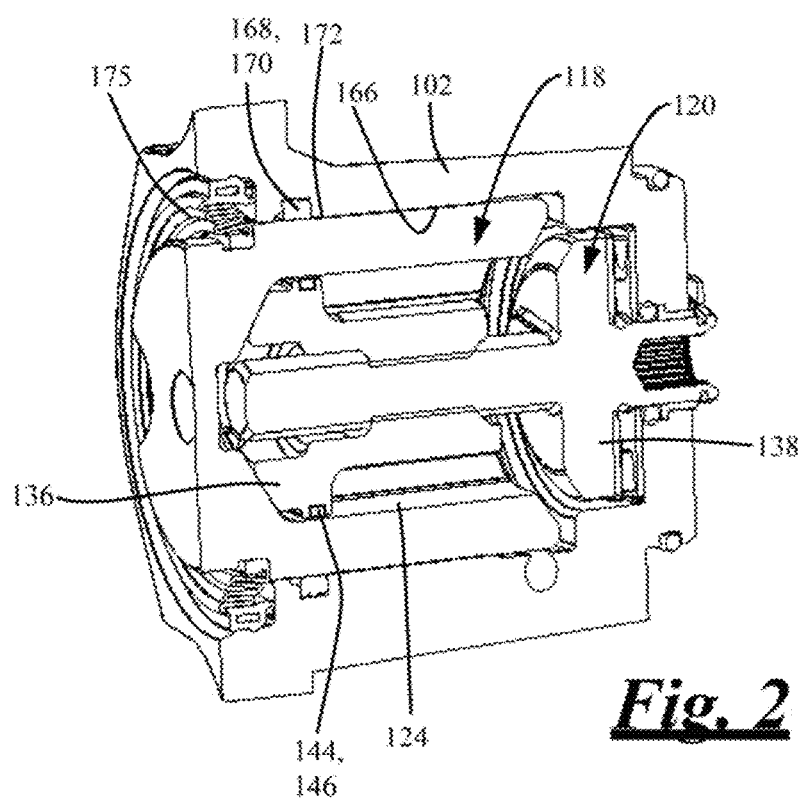
FIG. 2 is a perspective, cross-sectional view of a brake piston, a nut, and a spindle all located in a caliper bore of the brake caliper.

FIG. 2 illustrates a brake piston 118 located in a caliper bore 166 of the brake caliper 102. A linkage 120 comprising a nut 136 and a spindle 138 is located in a piston pocket 124 of the brake piston 118. The nut 136 includes a groove 144 around an outer circumference thereof. A nut seal 146 is located in the groove 144. A piston seal 170 that is located in a seal groove 168 of the brake caliper 102 forms an interference fit with an outer surface 172 of the brake piston 118. A piston boot 175 is located near an end of the brake piston 118.

FIGS. 3 and 4 illustrate the brake piston 118 and the linkage 120. The linkage 120 comprises a nut 136 and a spindle 138. During a parking brake apply and/or during release of the parking brake, the brake piston 118 is axially moved via the linkage 120 along a brake piston axis 134. The brake piston 118 includes an open end 122 leading into a piston pocket 124. The piston pocket 124 extends between the open end 122 and a bottom pocket wall or surface 126 (See FIG. 4 or 5). The piston pocket 124 includes an inner pocket wall 130 having one or more ribs or projections 132. The brake piston 118 includes an outer end surface 128 that, during a brake apply, a parking brake apply, or both, selectively contacts the pressure plate 112 of the inner brake pad 106.

During a parking brake apply and/or during release of the parking brake, the nut 136 is moved along a nut axis 140 towards or away from the bottom pocket surface 126, respectively. The nut 136 includes a first abutment 142 that, during a parking brake apply, contacts the bottom pocket surface 126. The nut 136 includes a second abutment 152 that, during release of the parking brake, is moved towards a spindle thread stop 154 on the spindle 138. Preferably, during release of the parking brake, the second abutment 152 does not contact the spindle thread stop 154; instead, a suitable gap is realized between the second abutment 152 and the spindle thread stop 154. For example, the gap between the second abutment 152 and the spindle thread stop 154 may be on the order of approximately 0.5 mm to 1.0 mm. The second abutment 152 may, however, contact the spindle thread stop 154 when worn brake pads are replaced with new brake pads, or when the brake caliper is removed from the vehicle support for service or maintenance, for example.

The nut 136 includes a groove 144 around a circumference thereof in which a nut seal 146 is received. The nut seal 146 is configured or adapted to engage the projections 132 extending from the inner pocket wall 130. One or more gaps 116 may be formed between the inner pocket wall 130 and the nut seal 146. The one or more gaps 116 may be formed between the nut seal 146 and the inner pocket wall 130 in areas adjacent the projections 116 where the nut seal 146 does not directly contact the inner pocket wall 130. The gaps 116 may be configured or adapted to allow air that may be trapped in the brake fluid to be evacuated so that brake pedal "feel" can be improved.

The nut 136 includes a threaded portion 148 that threadably engages corresponding threaded portion 150 of the spindle 138. The spindle 138 has an input portion 156 for receiving torque from the motor gear unit 104 (FIG. 1) so that during a parking brake apply and/or release of the parking brake, the spindle 138 is rotated in a corresponding apply or release direction about a spindle axis 158.

With additional reference to FIG. 5, each projection 132 extending from the inner pocket wall 130 includes a tip 160. When the nut 118 is received in the piston pocket 124, each tip 160 is configured or adapted to engage the nut seal 146. The tip 160 may have walls 162 that are angularly oriented α, β relative to the inner pocket wall 130. Relative to the piston axis 134, an angle θ is formed at a connection point 164 between one or more projection walls 162 of the projection 132 and the inner pocket wall 130.

With reference to FIGS. 1-5, to create the clamping force during a parking brake apply, the motor gear unit 104 may rotate the spindle 138 in a first direction (e.g. in an apply direction) about the spindle axis 158. The torque or engagement of the nut seal 146 against the inner pocket wall 130, the projections 132, or both may be greater than the torque generated due to friction at the thread interface of the spindle 138, and the nut 136. Accordingly, rotation of the spindle 138 in the first direction causes the nut 136 to axially move along the nut axis 140 towards the bottom pocket surface 126 rather than the nut 136 rotating about the nut axis 140. After the first abutment 142 makes contact with the bottom pocket surface 126, further rotation of the spindle 128 causes the nut 136 to axially move or push the brake piston 118 until the outer end surface 128 of the brake piston 118 contacts and moves the pressure plate 112 of the inner brake pad 106 against the brake rotor. At the same time, the fingers 114 of the brake caliper pull the outer brake pad 108 against an opposing side of the brake rotor at which time clamping force begins to be developed. At this time, the frictional contact, between the first abutment 142 and the bottom pocket surface 126 begins to generate and increase torque that may be proportional to the increase in clamping force, and continues to increase until the motor gear unit 104 stops rotating. The generated torque due to contact between the first abutment 142 and the bottom pocket surface 126 quickly becomes larger than the torque generated by the frictional contact between the nut seal 146 and the projections 132. The generated torque due to contact between the first abutment 142 and the bottom pocket surface 126 is preferably greater than the torque generated due to the frictional contact between the spindle 138 and the nut 136 so that the nut 136 does not rotate with respect to the brake piston 118 as long as clamping force is present.

With continued reference to FIGS. 1-5, to release the clamping force and/or the parking brake apply, the motor gear unit 104 may rotate the spindle 138 in a second direction (e.g., a release direction) about the spindle axis 158. The torque or frictional engagement of the nut seal 146 against the inner pocket wall 130, the projections 132, or both may be greater than the torque of the motor gear unit 104, the spindle 138, and the nut 136. Accordingly, rotation of the spindle 138 in the release direction causes the nut 136 to axially move along the nut axis rather than rotate. Continued rotation of the spindle 138 in the release direction causes the frictional contact between the first abutment 142 and the bottom pocket surface 126 to decrease torque in proportion to the decrease in clamping force. Preferably, the torque due to contact between the first abutment 142 and the bottom pocket surface 126 remains greater than the torque due to the frictional contact between the spindle 138 and the nut 136 so that the nut 136 does not rotate with respect to the brake piston 118 as long as some clamping force is present. Once the clamping force is fully released, the motor gear unit 104 may stop rotating the spindle 138 in the release direction. The clamping force is fully released when the first abutment 142 and the bottom pocket surface 126 are no longer in contact.

If the motor gear unit 104 continues to rotate the spindle 138 in the release direction after the clamping force is released, such as for pad replacement, for example, and the second abutment 152 contacts the spindle thread stop 154, the input torque at the nut 136 is greater than the torque due to the frictional engagement between the nut seal 146 and the inner pocket wall 130, the projections 132, or both so that the nut 136 rotates in the piston pocket. The torque due to the frictional engagement between the outer surface of the brake piston 118 and the piston seal 170 that engages the outer surface of the brake piston 118 (See FIG. 2) prevents the brake piston 118 from rotating during this condition. Accordingly, any further rotation of the spindle 138 in the release direction may cause the nut 136 to rotate inside the piston pocket 124 instead of the brake piston 118 rotating with respect to the piston seal 170 thereby preventing possible damage to the piston seal 170 and piston boot 175. Also, depending on the engagement between the nut seal 146 and the nut 136 or nut groove 144, the nut seal 146 may or may not rotate with the nut 136 during this condition when the nut 136 contacts the spindle thread stop 154. That is, if the torque due to the frictional engagement between the nut seal 146 and the inner pocket wall 130 and/or projections 132 is greater than the torque due to the engagement between the nut seal 146 and the nut 136 or the groove 144 in which the nut seal 146 is received, the nut 136 may "slip" relative to the seal 146 so that rotation of the spindle 138 will cause only the nut 136 to rotate with the spindle 138, while the nut seal 146 and the brake piston 118 do not rotate. The brake piston 118 is prevented from rotating because of the torque due to the piston seal 170 frictionally engaging an outer surface of the brake piston 118.

Alternatively, if the torque due to the frictional engagement between the nut seal 146 and the inner pocket wall 130 and/or projections 132 is less than the torque due to the engagement between the nut seal 146 and the nut 136 or the groove 144 in which the nut seal 146 is received, the nut seal 146 may "slip" or rotate relative to the brake piston 118 so that rotation of the spindle 138 will cause both the nut 136 and the nut seal 146 to rotate with the spindle 138, while the brake piston 118 does not rotate. Again, the brake piston 118 is prevented from rotating because of the torque due to the piston seal 170 frictionally engaging an outer surface of the brake piston 118.

Figure 6:
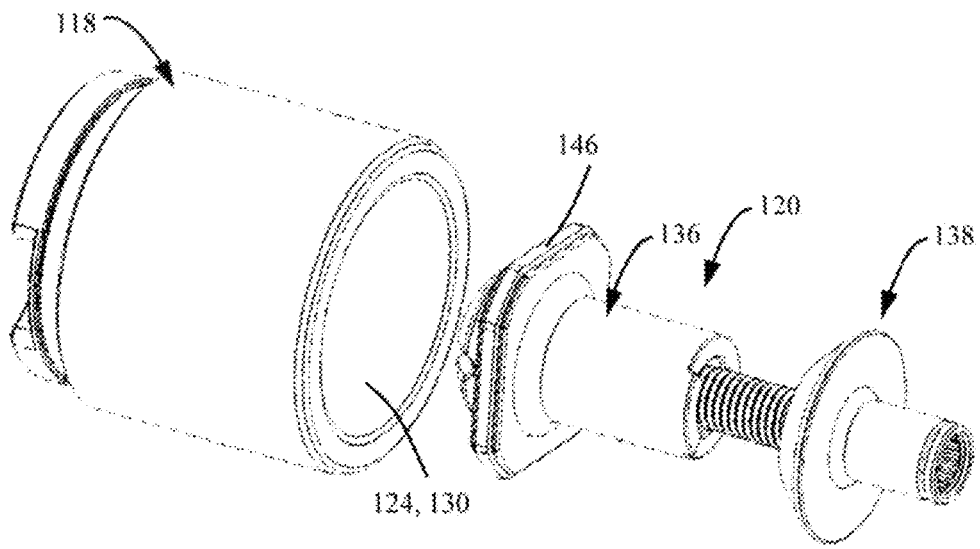
FIG. 6 is a perspective, exploded view of a brake piston, a nut, and a spindle.

FIG. 6 illustrates a brake piston 118 and linkage 120 including a nut 136 and a spindle 138. The brake piston 118 and linkage 120 of FIG. 6 are substantially the same as the brake piston 118 and linkage 120 at FIGS. 3-5, except for the following noted differences. The brake piston 118 includes a piston pocket 124 with an inner pocket wall 130 that is substantially smooth and cylindrical. That is, the piston pocket 124 in FIG. 6 does not include or is free of any projections, like the ones shown in FIGS. 3-5. The nut 136 is generally square-shaped in the region where the nut seal 146 is engaged in contrast to circular shape like shown in the previous figures; however, it is understood that in that region, the nut 136 may be triangular-shaped, pentagonal-shaped, hexagonal-shaped, or any regular polygonal shaped. The nut seal 146 shown in FIG. 6 is also generally square-shaped. However, the nut 136 may have a shape that differs from the nut seal 146. For example, the nut 136 may have a certain shape, such as a cylindrical or circular shape, for example, and the nut seal 146 may have a different shape, such as a triangular or polygonal shape for example. The nut seal 146 may have thicker or fatter projections that interfere with the piston pocket 124, the inner pocket wall 130, and/or the projections 132. It is understood, however, that while the piston pocket 118 and the nut 136 of FIG. 5 are slightly different than those shown in FIG. 2-5, their function is substantially the same. That is, the frictional engagement between the nut seal 146 and piston pocket 124 of FIG. 6 prevents the nut 136 from rotating within the piston pocket 124 during creation and/or release of the parking brake, but allows the nut 136 to rotate within the piston pocket 124 when the second abutment 152 contacts the spindle thread stop 154 so that the brake piston 118 does not rotate within the piston seal 170. The square shape of the nut 136 and the nut seal 146 may restrict or prevent the nut 136 from rotating in the piston pocket 124. In other words, when the nut 136 contacts the spindle thread stop and the spindle 138 continues to be rotated in a release direction, the square-shaped nut seal 146 may be restricted or prevented from 'slipping' relative to the inner pocket wall 130, the projections 132, or the seal groove in the nut 136 like described above in reference to FIGS. 3-5.

FIG. 7 illustrates a brake piston 118 with a piston pocket 124 having an inner pocket wall 130 that is substantially smooth and cylindrical. That is, the piston pocket 124 of FIG. 7 does not include, or free of, projections 126, like the ones shown in FIGS. 3-5; it is, however, understood that such projections may be included. The nut 136 includes a nut seal 146 that has one or more projections or fingers 174 that are configured or adapted to engage the inner pocket wall 130. Accordingly, when the linkage 120 is assembled in the brake piston 118, a gap is formed between the inner pocket wall 130 and the areas, gaps, or recesses in the seal 146 between the projections 174 so that air bubbles can be evacuated through the gaps during fluid bleeding, for example. Operation of the parking brake apply and release may be substantially similar to that described above relating to FIGS. 1-5.

Moreover, like FIGS. 3-5, if the motor gear unit 104 continues to rotate the spindle 138 in the release direction after the clamping force is released, such as for pad replacement, for example, and the second abutment 152 of the nut 136 contacts the spindle thread stop 154, the input torque at the nut 136 becomes greater than the frictional engagement between the nut seal 146 and/or projections or fingers 174 and the inner pocket wall 130 so that the nut 136 rotates in the piston pocket. Also, if the motor gear unit 104 continues to rotate the spindle 138 in the release direction after the clamping force is released, such as for pad replacement, for example, and the second abutment 152 of the nut 136 contacts the spindle thread stop 154, the frictional engagement between the nut seal 146 and/or projections or fingers 174 and the inner pocket wall 130 is preferably less than the torque due to the frictional engagement between the outer surface of the brake piston 118 and the piston seal 170 that engages the outer surface of the brake piston 118 (See FIG. 2). Accordingly, any further rotation of the spindle 138 in the release direction may cause the nut 136 to rotate inside the piston pocket 124 instead of the brake piston 118 rotating with respect to the piston seal 170 thereby preventing possible damage to the piston seal 170 and piston boot 175.

During the aforementioned condition when the nut 136 contacts the spindle thread stop 154, depending on the attachment or connection between the nut seal 146 and the nut 136 or nut groove in which the nut seal 146 is received, the nut seal 146 may or may not rotate with the nut 136. More specifically, if the torque due to the frictional engagement between the nut seal 146 or fingers 174 and the inner pocket wall 130 and/or projections 132 is greater than the torque due to the connection or engagement between the nut seal 146 and the nut 136 or the groove 144 in which the nut seal 146 is received, the nut 136 may "slip" relative to the seal 146 so that rotation of the spindle 138 will cause only the nut 136 to rotate with the spindle 138, while the nut seal 146 and the brake piston 118 do not rotate. The brake piston 118 is restricted or prevented from rotating due to the torque of the piston seal engaging an outer surface of the brake piston 118.

Alternatively, if the torque due to the frictional engagement between the nut seal 146 or fingers 174 and the inner pocket wall 130 and/or projections 132 is less than the engagement between the nut seal 146 and the nut 136 or the groove 144 in which the nut seal 146 is received, the nut seal 146 or fingers 174 may "slip" or rotate relative to the brake piston 118 so that rotation of the spindle 138 by the motor gear unit will cause both the nut 136 and the nut seal 146 to rotate with the spindle 138, while the brake piston 118 does not rotate. Again, the brake piston 118 is restricted or prevented from rotating due to the torque of the piston seal engaging an outer surface of the brake piston 118.

Any numerical values recited herein include all values from the lower value to the upper value in increments of one unit provided that there is a separation of at least 2 units between any lower value a any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Teachings of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations, of elements, ingredients, components or steps herein also contemplates embodiments that consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

LISTING OF REFERENCE NUMERALS

100 Brake caliper assembly
102 Brake caliper
104 Motor gear unit
106 Inner brake pad
108 Outer brake pad
110 Friction material
112 Pressure plate
114 Brake caliper fingers
116 Gaps
118 Brake Piston
120 Linkage
122 Open end
124 Piston pocket
126 Bottom pocket surface
128 Outer end surface
130 inner pocket wall
132 Projections
134 Brake piston axis
136 Nut
138 Spindle
140 Nut axis
142 First abutment
144 Seal groove
146 Nut seal
148 Threaded portion
150 Threaded portion
152 Second abutment
154 Thread stop
156 Input portion
158 Spindle axis
160 Tip
162 Projection Wall
164 Connection point
166 caliper bore
168 seal groove
170 piston seal
172 outer surface (of the brake piston 118)
174 projections (on nut seal 146)
175 piston boot
α Angle
β Angle
θ Angle

The invention claimed is:

1. A brake piston comprising:
   a piston pocket adapted to receive a nut, the nut includes a flexible nut seal in contact with the piston pocket, the piston pocket includes one or more projections that project from an inner pocket wall of the piston pocket, wherein a gap is defined between the inner pocket wall and the nut seal in areas adjacent one or more of the one or more projections.

2. The brake piston of claim 1, wherein the nut seal comprises a square cross section.

3. The brake piston of claim 2, wherein the nut has a square cross section.

4. The brake piston of claim 1, wherein the nut seal includes one or more fingers that contact the piston pocket.

5. The brake piston of claim 1, wherein the one or more projections extend along at least a portion of a length of the piston pocket, each of the one or more projections partially extend from the inner pocket wall towards a center axis of the brake piston.

6. The brake piston of claim 1, wherein the nut seal is disposed around at least a portion of an outer perimeter of the nut.

7. The brake piston of claim 1, wherein the nut comprises a groove defined in at least a portion of an outer perimeter thereof, the nut seal is located inside the groove.

8. The brake piston of claim 1, wherein the nut seal is at least partially deformed in areas of contact with the piston pocket.

9. The brake piston of claim 1, wherein the nut seal is at least partially deformed in areas of contact with the one or more projections.

10. The brake piston of claim 1, wherein the nut seal includes a plurality of fingers that contact the piston pocket, each of the fingers are spaced apart from adjacent fingers by approximately 30 degrees or more around a perimeter of the nut seal.

11. The brake piston of claim 1, wherein the piston pocket comprises three projections.

12. The brake piston of claim 1, wherein the nut seal comprises a rubber material.

13. The brake piston of claim 1, wherein the nut seal comprises a compliant material.

14. A brake system comprising:
   a brake piston having a piston pocket;
   a nut located inside the piston pocket;
   a spindle connected to the nut, the spindle comprises a spindle stop;
   a nut seal disposed around at least a portion of the nut, the nut seal is configured to engage the piston pocket;
   wherein after the nut is in contact with the spindle thread stop, rotation of the spindle causes the engagement of the nut seal and the piston pocket to slip so that the nut rotates inside of the piston pocket, and
   wherein when the nut is free of contact with the spindle thread stop, the engagement of the nut seal and the piston pockets is configured to restrict the nut from rotating inside of the piston pocket when the spindle is rotated.

15. The brake system of claim 14, wherein the nut seal includes a plurality of fingers that contact the piston pocket, each of the fingers are spaced apart from adjacent fingers by approximately 30 degrees or more around a perimeter of the nut seal.

16. The brake system according to claim 14, wherein the nut seal comprises a compliant material.

17. The brake system according to claim 14, wherein the nut seal comprises a square cross section.

18. The brake system according to claim 14, wherein the nut has a square cross section.

19. The brake system according to claim 14, wherein when the nut is free of contact with the spindle thread stop, rotation of the spindle causes the nut to move axially along a length of the spindle.

20. The brake system according to claim 14, wherein the piston pocket includes one or more projections, each of the one or more projections partially extend from an inner pocket wall towards a center axis of the brake piston, the nut seal contacts one or more of the one or more projections, and
    wherein a gap is defined between the inner pocket wall and the nut seal in areas adjacent one or more of the one or more projections.

\* \* \* \* \*